United States Patent
Shaw

[19]

[11] Patent Number: 6,141,980
[45] Date of Patent: Nov. 7, 2000

[54] EVAPORATOR GENERATED FOAM CONTROL OF COMPRESSION SYSTEMS

[76] Inventor: David N. Shaw, 200 D Brittany Farms Rd., New Britain, Conn. 06053

[21] Appl. No.: 09/245,516

[22] Filed: Feb. 5, 1999

Related U.S. Application Data

[60] Provisional application No. 60/073,734, Feb. 5, 1998.

[51] Int. Cl.[7] ................................................. F25B 49/02
[52] U.S. Cl. ................................ 62/210; 62/222; 62/505
[58] Field of Search .......................... 62/212, 222, 211, 62/210, 223, 224, 225, 204, 205, 206, 193, 505

[56] References Cited

U.S. PATENT DOCUMENTS

| | | | |
|---|---|---|---|
| 4,261,180 | 4/1981 | Nozawa et al. | 62/222 X |
| 4,620,424 | 11/1986 | Tanaka et al. | 62/222 |
| 4,706,469 | 11/1987 | Oguni et al. | 62/210 X |
| 5,224,354 | 7/1993 | Ito et al. | 62/210 |
| 5,709,094 | 1/1998 | Ooyabu et al. | 62/225 X |
| 5,816,055 | 10/1998 | Ohman | 62/117 |

*Primary Examiner*—Harry B. Tanner
*Attorney, Agent, or Firm*—Cantor Colburn LLP

[57] ABSTRACT

A system for controlling the amount of foam ingested to a compressor of a cooling system is presented. The present invention utilizes a heated thermistor to control an electrically positioned expansion valve feeding liquid refrigerant to a system evaporator. The thermistor is controlled to be a few degrees warmer than the discharge saturation temperature of the refrigerant exiting the compressor. The saturation temperature corresponding to the compressor discharge pressure is calculated by a microprocessor and compared to the thermistor temperature. If the difference is greater or less than desired, the microprocessor will send the proper signals to the electrically positioned expansion valve thereby controlling the rate of foam ingested by the compressor.

14 Claims, 1 Drawing Sheet

INGESTION CONTROL SYSTEM

INGESTION CONTROL SYSTEM

EVAPORATOR GENERATED FOAM CONTROL OF COMPRESSION SYSTEMS

This Application claims priority to U.S. Provisional Application Ser. No. 60/073,734 filed Feb. 5, 1998.

BACKGROUND OF THE INVENTION

Field of the Invention

The present invention relates to systems for cooling which employ an evaporator. More specifically, the present invention relates to a refrigeration system employing a control scheme to manage the flow of foam into the compressor.

Refrigeration systems of today, up to about 15 tons, control the flow into the evaporator such that much evaporator surface is not wasted due to needless superheating of the vapor exiting the evaporator. Thermal expansion valves are widely used to control superheat. A liquid filled bulb measures the temperature of the refrigerant leaving the evaporator. This temperature generates a pressure that is communicated to a first side of a diaphragm in the expansion valve. A second side of the diaphragm is exposed to the evaporating pressure. If the temperature gets too high leaving the evaporator, a higher pressure on the first side of the diaphragm drives the valve open further, admits more refrigerant resulting in a lower exiting vapor temperature. The evaporating pressure also rises somewhat due to more effective use of the evaporator surface. The overall response of the valve controls the superheat but wastes surface by superheating.

Other systems utilize an electrically heated thermistor at the outlet of a direct expansion evaporator in order to control the flow of refrigerant into the evaporator. The heated thermistor valve controls flow into the evaporator because the thermistor temperature drops very quickly when liquid refrigerant impinges on it. It controls close to saturation which is ideal for the evaporator heat transfer. However, this valve is more expensive than the old thermal expansion valves described herein above and has precluded its widespread use up to the present day.

In systems of the size range of interest herein, still other systems utilize an electronic expansion valve which responds to liquid level in the evaporator shell. If the level drops, the valve is opened slightly; whereas if it rises too high, the valve is closed slightly. This is good for a conventional chiller but would not be satisfactory for a system designed to ingest foam from the evaporator.

With the ingested system, the level must be higher under low load (capacity) because less flow is available to generate and suck foam. Under high load, the level must be somewhat lower or too much liquid will be ingested into the compressor.

In an ingestion process it is advantageous to admit enough liquid into the compressor from the evaporator to seal, cool, lubricate, and quiet the compression process itself. The liquid that is ingested from the evaporator will be mostly liquid refrigerant but, there may be some percentage of lubricant as it is desirable to have at least a tiny amount of lubricant dissolved in the liquid refrigerant. Pure liquid refrigerant is not a viable lubricant for metallic interfaces. It is an excellent coolant but does not have an effective quality of lubrication. Its viscosity is about one third that of water and water is not considered a good lubricant. In any event, it appears desirable to have a tiny amount of lubricating material contained in the liquid refrigerant. One problem is that the lubricant and refrigerant mixture foams within the evaporator. What is needed is a control scheme which reacts quickly to changing load conditions for use with an ingestion system.

SUMMARY OF THE INVENTION

The above-discussed and other drawbacks and deficiencies of the prior art are overcome or alleviated by the present invention.

The present invention utilizes a heated thermistor to control an electrically positioned expansion valve feeding liquid refrigerant to a system evaporator. The thermistor is controlled to be a few degrees warmer than the saturation temperature of the refrigerant exiting the compressor. The amount of heat being added to the thermistor tends to raise its temperature whereas liquid refrigerant impinging on it tends to lower its temperature. Within limits, more heat added to the thermistor will cause liquid carryover to increase while less heat added will cause liquid carryover to decrease. The saturation temperature corresponding to the compressor discharge pressure is calculated by microprocessor and compared to the thermistor temperature. If the difference is greater or less than desired, the microprocessor will send the proper signals to the electrically positioned expansion valve. This will occur regardless of the load on the system.

The above discussed and other features and advantages of the present invention will be appreciated and understood by those skilled in the art from the following detailed description and drawings.

DETAILED DESCRIPTION OF THE PREFERRED EMBODIMENT

Figure 1:
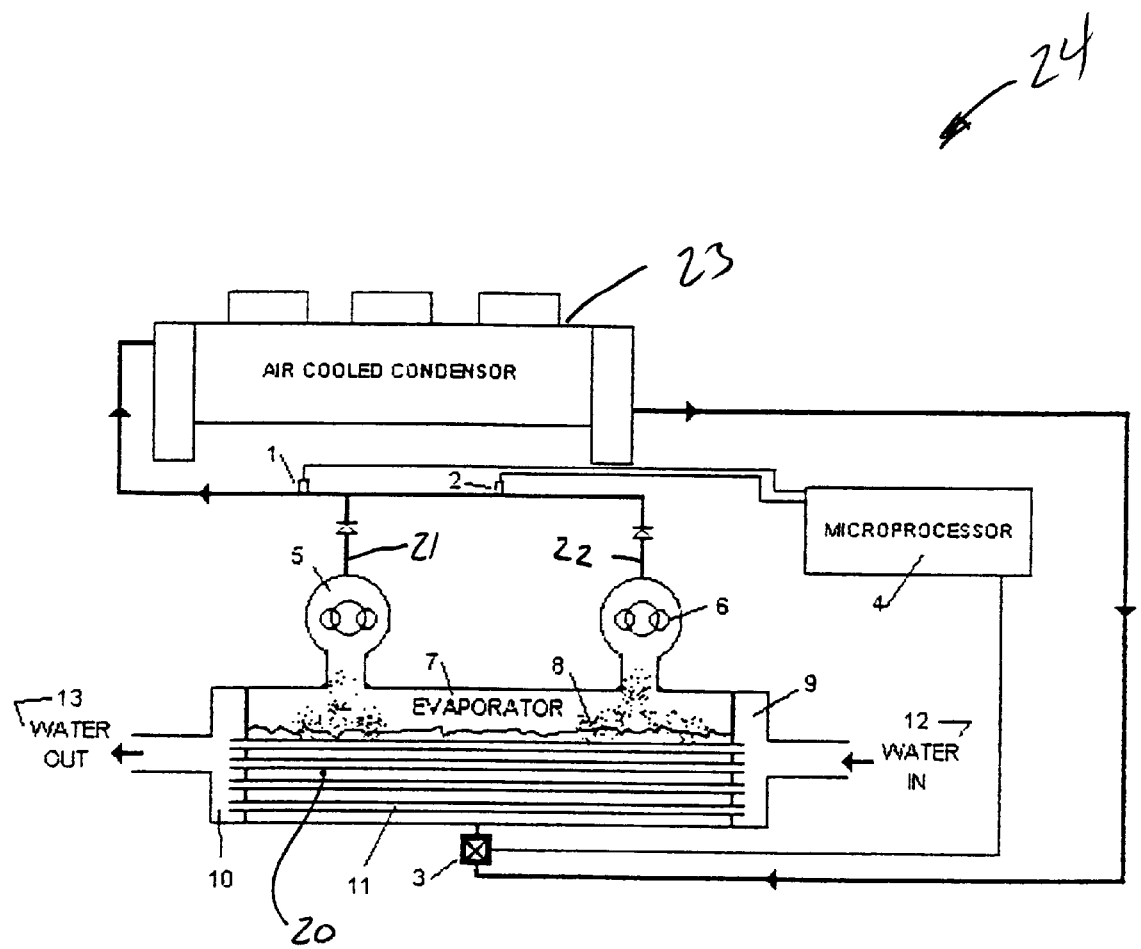
FIG. 1 is a refrigeration system in accordance with the present invention.

Referring to FIG. 1 in a flooded evaporator 7, liquid refrigerant and lubricant 20 is boiled to a foam 8 as it cools warm inlet water 12 in tubes 11. Water 12 enters evaporator 7 through header 9 and is passed through tubes 11 where it is presented in heat exchange relationship with cool refrigerant 20 which enters the evaporator via electrically positioned expansion valve 3. As the refrigerant 20 is boiled, the concentration of lubricant at the surface of the boiling liquid refrigerant increases. At the effective top of the boiling level, foam 8 will develop. The bubbles making up this foam comprise a liquid skin enclosing a vapor bubble. The liquid skin comprises a liquid refrigerant with dissolved liquid lubricant. It is advantageous to ingest enough of foam 8 into the compressor to cause a small percentage of liquid to exit the compressor discharge 21,22 along with the normal compressed vapor. The actual magnitude of the liquid refrigerant and lubricant in an embodiment is between 2% and 12% (by weight) of the total mass flow liquid and compressed vapor exiting the compressor. In this embodiment the amount of lubricant is controlled to range from about 0% to about 3% (by weight) of the total mass flow liquid and compressed vapor exiting the compressor. The correct amount for any given embodiment is determined to be that percentage which will give the best possible balance of high compression efficiency and low noise. The noise reduction comes about because the liquid refrigerant exiting the compressor is very close to saturation. In this saturated compression process, a rising pressure pulse is snubbed as vapor is instantly condensed in the liquid refrigerant and a falling pulse is snubbed by vapor instantly flashing out of the liquid.

The vapor compression cycle follows the saturation line on a typical pressure enthalpy diagram. The liquid entrained during compression absorbs some of the work input to the process itself This reduces the overall work requirement of the refrigeration process and, thus, makes up for the work that must be expended to generate the ingested cold liquid in the first place. Additional vapor is created during the expansion process across valve 3 and is a very small percentage of the total vapor formed within the evaporator. Accordingly, the increase in performance comes about due to the reduction in viscous drag of this type of process as opposed to an oil sealed process of the prior art. In accordance with the present invention the compressor 5,6 operating clearances are small enough so that increased internal leakage does not negate the potential efficiency increase.

The air cooled condenser 23 shown in FIG. 1 is an example of a suitable condenser and could be water cooled or other type of known condenser. Although any number of compressors, including one, could be employed two compressors 5,6 are shown by way of example. Likewise, a flooded evaporator 7 is shown, but could also be a direct expansion type. In the direct expansion type, the refrigerant enters inside the tubes and the water is baffled around the outside of the tubes.

In operation, thermistor 1 of ingestion control system 24 is heated to a level a few degrees warmer than the saturation temperature of the refrigerant exiting the compressors 5,6. Pressure transducer 2 monitors the pressure of the refrigerant exiting the compressors 5,6 and a corresponding signal is sent to microprocessor 4, along with a signal corresponding to the temperature of the refrigerant as sensed by thermister 1. Microprocessor 4 calculates the saturation temperature corresponding to the temperature and pressure signals provided by thermistor 1 and transducer 2 and compares it to a predetermined level. If the difference is greater or less than a predetermined level, microprocessor 4 sends a signal to electronically operated expansion valve 3. Microprocessor 4 maintains the feed of liquid refrigerant 20 into evaporator 7 by opening or closing expansion valve 3 based on output from thermistor 1 and transducer 2 to maintain an optimum foam/liquid ratio entering compressors 5,6.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A cooling system comprising:

an evaporator for partially evaporating a coolant;

a compressor in communication with said evaporator for compressing partially-evaporated saturated coolant from said evaporator;

a condenser in communication with said compressor for condensing compressed saturated coolant from said compressor;

an expansion valve in communication with said condenser and said evaporator for expanding condensed coolant from said condenser and passing expanded condensed coolant to the evaporator; and a control system controlling the expansion valve such that the coolant exiting the compressor is in a saturated state and includes a mixture of liquid and gas phases of the coolant.

2. The cooling system of claim 1 wherein:

the control system is responsive to a temperature sensor between one of said compressor and said condenser and a pressure sensor between the compressor and expansion valve, wherein the temperature sensor is responsive to the temperature of the coolant and the pressure sensor is responsive to the pressure of the coolant.

3. The cooling system of claim 2 wherein:

the temperature sensor comprises a heated thermistor.

4. The cooling system of claim 3 wherein said heated thermistor is heated to a few degrees above the saturation temperature and a ratio of liquid coolant to gas coolant of the compressed saturated coolant is controlled in response to the heated thermistor.

5. The coolant system of claim 1 further comprising an amount of lubricant mixed with the coolant.

6. The coolant system of claim 1 wherein said control system comprises:

at least one heated temperature sensor positioned downstream of the compressor and upstream of the condenser;

at least one pressure sensor positioned downstream of the compressor and upstream of the expansion valve; and an expansion valve controller operating said expansion valve in response to said temperature and pressure sensors to maintain an optimum mixture of liquid and gas coolant entering the compressor and a saturated mixture of liquid and gas exiting the compressor.

7. The coolant system of claim 1 wherein said control system comprises:

at least one heated thermistor positioned downstream of one of the compressor and upstream of the condenser generating at least one temperature signal indicative of a temperature of the coolant;

at least one pressure transducer positioned downstream of the compressor and upstream of the expansion valve generating at least one pressure signal indicative of a pressure of the coolant;

a control unit:

inputting said pressure signal and said temperature signal;

calculating a saturation temperature corresponding to said signals;

controlling said heated thermistor to a few degrees above the saturation temperature; and outputting a control signal to said expansion valve depending on said signals.

8. A method of controlling an expansion valve in a cooling system including an evaporator for partially evaporating a coolant;

a compressor in communication with the evaporator for compressing partially-evaporated saturated coolant from the evaporator;

a condenser in communication with the compressor for condensing compressed saturated coolant from the compressor; and an expansion valve in communication with the condenser and said evaporator for expanding condensed coolant from said condenser and passing expanded condensed coolant to the evaporator; the method comprising:

controlling the expansion valve such that coolant exiting the compressor is in a saturated state and includes a mixture of liquid and gas phases of the coolant.

9. The method of claim 8 wherein said controlling comprises:

sensing a temperature of the coolant between said compressor and said condenser;

sensing a pressure of the coolant between the compressor and the expansion valve; and using said temperature and said pressure in controlling the expansion valve.

10. The method of claim 9 wherein said sensing a temperature comprises:

controlling a heated thermistor to be a few degrees warmer than the saturation temperature of the coolant exiting the compressor.

11. The method of claim 10 wherein a ratio of liquid coolant to gas coolant of the compressed saturated coolant is controlled in response to the heated thermister.

12. The method of claim 8 wherein said coolant includes an amount of lubricant mixed in.

13. The method of claim 8 wherein said controlling comprises:

using at least one heated temperature sensor positioned downstream of the compressor and upstream of the condenser to generate a temperature signal;

using at least one pressure sensor positioned downstream of the compressor and upstream of the expansion valve to generate a pressure signal;

operating the expansion valve in response to said pressure signal and said temperature signals to maintain an optimum mixture of liquid and gas coolant entering the compressor so that said coolant exiting the compressor is an optimum mixture of saturated liquid and gas coolant.

14. The method of claim 8 wherein said controlling further comprises:

generating at least one temperature signal in response to a heated temperature sensor positioned downstream of the compressor and upstream of the condenser;

generating at least one pressure signal in response to a pressure transducer positioned downstream of the compressor and upstream of the expansion valve;

calculating a saturating temperature corresponding to said signals;

controlling the heated temperature sensor to a few degrees above the saturation temperature; and outputting a control signal to the expansion valve depending on the signals.

* * * * *